Oct. 27, 1942.                R. E. DE HOOG                 2,300,110
                               LIQUID METER
                            Filed July 12, 1941
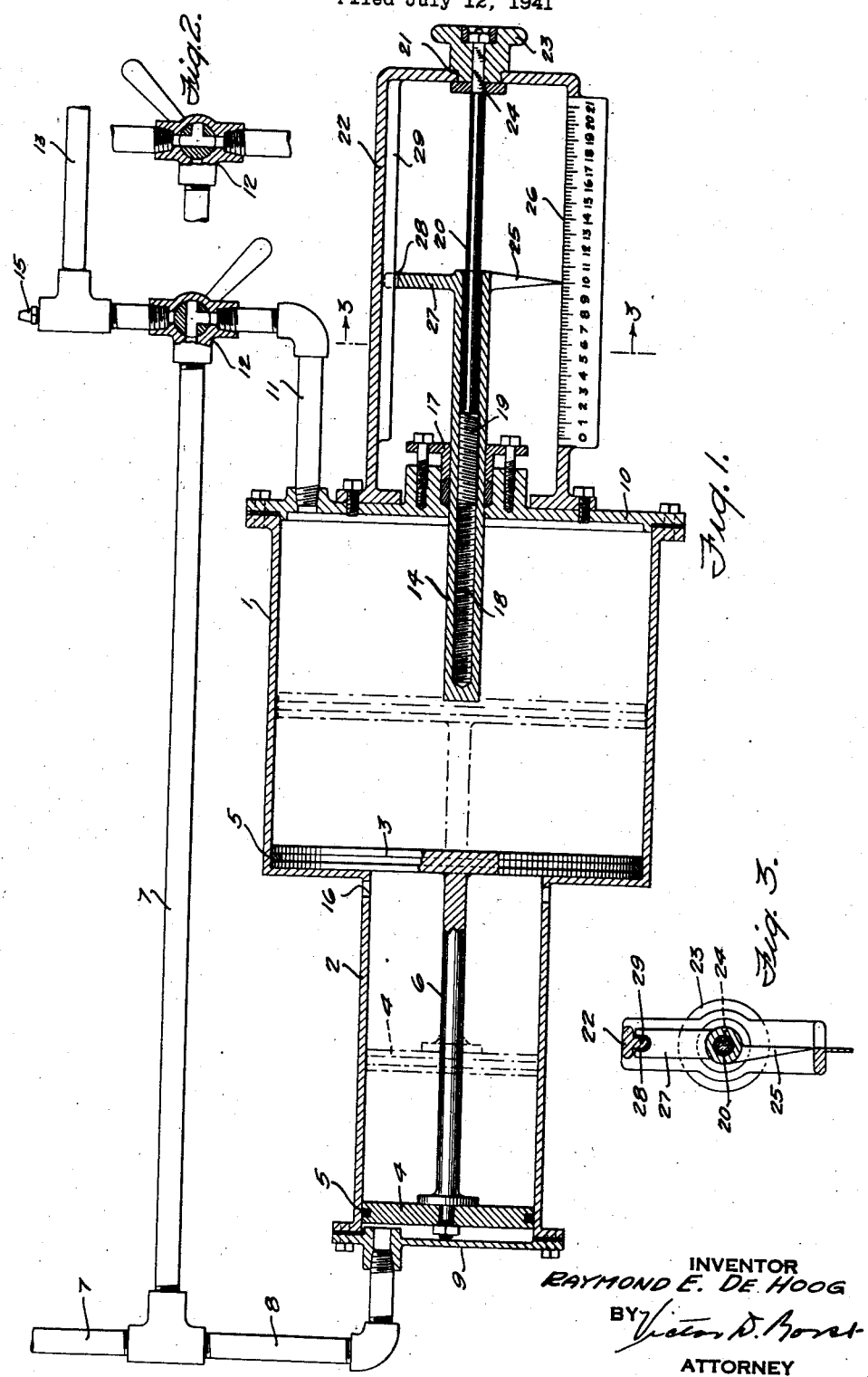
INVENTOR
RAYMOND E. DE HOOG
BY
ATTORNEY Patented Oct. 27, 1942

2,300,110

UNITED STATES PATENT OFFICE 2,300,110

LIQUID METER

Raymond E. De Hoog, White Plains, N. Y., assignor to Aulene B. De Hoog, White Plains, N. Y.

Application July 12, 1941, Serial No. 402,173

3 Claims. (Cl. 221—102)

This invention relates to liquid dispensing apparatus of the type wherein a definite predetermined quantity of liquid can be successively dispensed as desired. It is especially suitable for measuring water used with concrete mixers to obtain a regulated quantity of water for each batch, but it is equally applicable to many other uses.

The principal object of the invention is the provision of a simple and efficient device of this character that can be readily attached to any water supply pipe through which water is delivered under pressure.

Another object of the invention is the provision of a device of this character wherein the pressure of the liquid supplied thereto to be dispensed is utilized for operating the device.

Another object of the invention is the provision in a liquid measuring and dispensing apparatus of improved means for readily varying the amount of liquid dispensed during each stroke thereof.

The invention has other objects and advantages which will appear from the following description, from which it will be seen that a characteristic of my invention is the use of a differential floating piston the small end of which is constantly connected to pressure and the large end of which is selectively connected to pressure or discharge. In this way the pressure of the liquid itself furnishes the power both to charge and discharge the device, a stroke in one direction being for charging and a stroke in the opposite direction being for discharging. Conveniently an adjustable stop may regulate the quantity delivered.

I shall now describe the illustrated embodiment of my invention and shall thereafter point out my invention in claims.

Fig. 1 is a central longitudinal sectional view through my improved liquid dispenser, the control valve being in non-dispensing position;

Fig. 2 is a section through the control valve showing it in dispensing position; and Fig. 3 is a transverse section taken on the line 3—3 of Fig. 1.

Referring to the drawing by reference characters the numeral 1 indicates a measuring cylinder, and the numeral 2 indicates a power cylinder which is secured to the measuring cylinder and extends rearwardly therefrom in axial alignment therewith. As shown the diameter of the power cylinder 2 is approximately half the diameter of the measuring cylinder 1. Pistons 3 and 4 provided with suitable piston rings 5 are reciprocally mounted in the cylinders 1 and 2 respectively, and are connected together by a connecting rod 6 so that they will move in unison.

Water under pressure from a supply pipe 7 is constantly admitted, through a connection 8, to the cylinder 2 between the head 9 thereof and the piston 4. The cylinder 1, between the head 10 thereof and the piston 3 therein, is alternately connected through a connection 11 and a three-way valve 12 to the supply pipe 7 and a discharge pipe 13.

When the three-way valve 12 is turned to the position shown in Fig. 1 water under pressure from the supply pipe 7 is admitted to the cylinder 1, filling the cylinder 1 and moving the piston 3 from the position shown in dotted lines back to the position shown in full lines. The movement of the piston 3 will move the piston 4, through the connecting rod 6, from the position shown in dotted lines back to the position shown in full lines, forcing the water in the cylinder 2 between the piston 4 and the head 9, back into the supply pipe 7. This is due to the differences in the diameters of the cylinders 1 and 2 and of the pistons 3 and 4. The pressure in pounds per square inch is the same on both the pistons 3 and 4 but the total pressure on the piston 3 is approximately four times the total pressure on the piston 4, when the relative sizes of the two pistons are the same as illustrated; that is, the diameter of the piston 3 is approximately twice the diameter of the piston 4.

When it is desired to dispense a charge of liquid the three-way valve 12 is turned to the position shown in Fig. 2. This connects the cylinder 1 to the discharge pipe 13 and reduces the pressure therein from that in the supply pipe 7 to substantially atmospheric pressure. The total pressure on the piston 3 then being less than the total pressure on the piston 4, the pistons 3 and 4 will be moved by the pressure of the liquid in power cylinder 4 from the full line positions to the dotted line positions where the piston 3 engages an adjustable stop 14. As the piston 3 moves forwardly it will force liquid out of the cylinder 1 through the connection 11, valve 12 and discharge pipe 13, until it comes into engagement with the adjustable stop 14 which is provided to regulate the amount of liquid dispensed by each stroke of the pistons 3 and 4. After each charge of liquid has been dispensed the valve 12 is turned back to the position shown in Fig. 1, which will as previously described, admit water under pressure to the cylinder 1 from the supply pipe 7, forcing the pistons 3 and 4 back to the full line positions and refilling the measuring cylinder 1 ready for the next discharge. An automatic air vent 15 is provided in the discharge line 13 to prevent any tendency to siphon liquid from the cylinder 1; and a vent 16 is provided in the cylinder 2 adjacent the cylinder 1 between the pistons 3 and 4 to insure free movement of the pistons 3 and 4.

The adjustable stop 14, which as stated above is provided to regulate the amount of liquid dispensed each stroke, is slidably supported in a packing gland 17 formed in the head 10 of the cylinder 1. The stop 14 as shown is an elongated bar or rod having a threaded bore 18 in which is received the threaded end 19 of a rod 20 which is rotatably supported and restrained from longitudinal movement by a bearing 21 in a bracket 22 secured to and extending outwardly as shown from the head 10 of the cylinder 1. The rod 20 is adapted to be rotated by a handwheel 23 secured to the reduced squared end 24 thereof. The stop 14 can be moved in or out as desired by the proper rotation of the rod 20. The position of the stop 14 determines the length of the stroke of the pistons 3 and 4 and thus regulates the amount of liquid dispensed each stroke. A pointer 25 fastened to the outer end of the stop 14 and a cooperating scale 26 secured to one leg of the bracket 22 are provided so that the device may be quickly and easily adjusted to dispense any desired amount of liquid each time it operates.

The stop 14 is prevented from rotating with the rod 20 by a lug 27, secured to the outer end thereof, having a bifurcated end 28 which slidably engages a rib 29 formed on the inner face of one leg of the bracket 22.

It will be understood that various modifications can be made in the construction of my dispensing apparatus as illustrated and described herein without departing from the scope of the invention as pointed out in the following claims.

I claim:

1. In an apparatus for dispensing measured quantities of liquid the combination with a supply of liquid under pressure to be dispensed, of a measuring cylinder, a discharge conduit, means for selectively connecting said measuring cylinder to said liquid supply or to said discharge conduit to admit liquid to said measuring cylinder or to allow liquid to be forced out of said measuring cylinder through said discharge conduit, means operated by the pressure of the liquid supply for forcing liquid out of said measuring cylinder when said measuring cylinder is connected to said discharge conduit, said last mentioned means comprising a power cylinder of lesser diameter than said measuring cylinder, a piston in said measuring cylinder, a piston in said power cylinder operatively connected to the piston in said measuring cylinder so that said pistons move in unison, and a connection between said liquid supply and said power cylinder through which liquid under pressure is constantly admitted to said power cylinder.

2. In an apparatus for dispensing measured quantities of liquid the combination with a supply of liquid under pressure to be dispensed, of a measuring cylinder, a discharge conduit, means for selectively connecting said measuring cylinder to said liquid supply or to said discharge conduit to admit liquid to said measuring cylinder or to allow liquid to be discharged from said measuring cylinder, a piston in said measuring cylinder operable to force liquid out of said measuring cylinder through said discharge conduit when said measuring cylinder is connected to said discharge conduit, adjustable means to limit the stroke of said piston through which the amount of liquid dispensed by each stroke of the piston may be varied, means for operating said piston, said means comprising a power cylinder of lesser diameter than said measuring cylinder, a piston in said power cylinder operatively connected to said piston in said measuring cylinder so that said pistons move in unison, and means connecting said power cylinder and said liquid supply through which liquid under pressure is constantly admitted to said power cylinder.

3. In an apparatus for dispensing measured quantities of liquid the combination with a supply of liquid under pressure to be dispensed, of a measuring cylinder, a discharge conduit, means for selectively connecting said measuring cylinder to said liquid supply or to said discharge conduit to admit liquid to said measuring cylinder or to allow liquid to be discharged from said measuring cylinder, a piston in said measuring cylinder operable to force liquid out of said measuring cylinder through said discharge conduit when said measuring cylinder is connected to said discharge conduit, means for operating said piston, said means comprising a power cylinder of lesser diameter than said measuring cylinder, a piston in said power cylinder operatively connected to the piston in said measuring cylinder whereby said pistons move in unison, and means connecting said power cylinder and said liquid supply through which liquid under pressure is constantly admitted to said power cylinder; and adjustable means for limiting the stroke of said pistons whereby the amount of liquid dispensed by each stroke of the pistons may be varied, said last mentioned means comprising an abutment slidably mounted in a suitable guide in the head of said measuring cylinder and projecting into said measuring cylinder, means for adjusting said abutment back and forth in said measuring cylinder and for retaining said abutment in adjusted position and a cooperating scale for indicating the adjustment of said abutment.

RAYMOND E. DE HOOG.